(12) United States Patent
Jung

(10) Patent No.: US 8,147,112 B2
(45) Date of Patent: Apr. 3, 2012

(54) BACKLIGHT ASSEMBLY AND LIQUID CRYSTAL DISPLAY HAVING THE SAME

(75) Inventor: Whi Keug Jung, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 111 days.

(21) Appl. No.: 11/819,927

(22) Filed: Jun. 29, 2007

(65) Prior Publication Data

US 2008/0002433 A1    Jan. 3, 2008

(30) Foreign Application Priority Data

Jun. 30, 2006    (KR) ........................ 10-2006-0060494
Jun. 30, 2006    (KR) ........................ 10-2006-0060495

(51) Int. Cl.
*F21V 7/04*      (2006.01)
(52) U.S. Cl. ...................... 362/621; 362/615; 362/628
(58) Field of Classification Search .......... 362/611–612, 362/621, 628, 615–629, 26; 349/62, 65
See application file for complete search history.

(56) References Cited

U.S. PATENT DOCUMENTS

| | | | |
|---|---|---|---|
| 6,280,043 B1 * | 8/2001 | Ohkawa | 362/626 |
| 6,406,160 B1 * | 6/2002 | Itoh | 362/609 |
| 6,616,289 B2 * | 9/2003 | Umemoto et al. | 362/600 |
| 6,669,356 B2 * | 12/2003 | Okuno | 362/311.01 |
| 6,871,974 B2 * | 3/2005 | Kashiwagi et al. | 362/26 |
| 7,309,153 B2 * | 12/2007 | Arihara | 362/615 |
| 7,347,610 B2 * | 3/2008 | Chang et al. | 362/621 |
| 7,357,557 B2 * | 4/2008 | Miyashita | 362/615 |
| 2005/0254258 A1 * | 11/2005 | Lee | 362/612 |

* cited by examiner

*Primary Examiner* — Robert May
(74) *Attorney, Agent, or Firm* — McKenna Long & Aldrige LLP

(57) ABSTRACT

A backlight assembly is suitable for emitting uniform flat light. The backlight assembly causes light from a lamp to travel in the form of flat light using a light guide plate disposed to have one plane facing the lamp. The light guide plate includes one or more rounded portions at one or more edges of an incident plane thereof onto which the light from the lamp is incident, and the one or more rounded portions cause the light from the lamp to travel into the light guide plate.

6 Claims, 11 Drawing Sheets

BACKLIGHT ASSEMBLY AND LIQUID CRYSTAL DISPLAY HAVING THE SAME

This application claims the benefit of Korean Patent Application No. 10-2006-0060494, filed on Jun. 30, 2006 and Korean Patent Application No. 10-2006-0060495, filed on Jun. 30, 2006), which are hereby incorporated by reference for all purposes as if fully set forth herein.

BACKGROUND OF THE INVENTION

1. Field of the Invention

The present invention relates to a backlight assembly for emitting flat light, and a liquid crystal display having the same.

2. Discussion of the Related Art

Flat display devices are generally divided into emissive type flat display devices and non-emissive type flat display devices. The emissive type flat display devices include plasma display devices and electro-luminescent display devices. In contrast, the non-emissive type flat display devices include liquid crystal displays (LCDs), as a representative example thereof.

The LCDs control an amount of transmission of light that is incident from the outside, because they do not spontaneously emit the light. For this reason, the LCDs have difficulty in displaying an image in a dark place. To solve this problem, each LCD is equipped with a backlight assembly, which emits flat (or two-dimensional) light. The backlight assembly irradiates the light to the rear surface of a liquid crystal panel of the LCD. Further, the backlight assembly is used in flat panel graphic displays, such as lighting signs, in addition to the non-emissive type display devices, such as LCDs.

This backlight assembly is divided into a direct type and an edge type according to the arrangement of a light source. The direct-type backlight assembly has a plurality of light sources disposed below a radiating surface of the light. The light sources directly emit light to the rear surface of a light irradiating target (i.e. a liquid crystal panel). Meanwhile, the edge-type backlight assembly includes a light source installed on one side of a light guide plate, and the light guide plate guides the light from the light source to the entire surface of the liquid crystal panel. The light guide plate causes the light generated from the light source to radiate to the rear surface of the target (i.e. the liquid crystal panel) in the form of flat light.

In comparison with the direct-type backlight assembly, the edge-type backlight assembly remarkably reduces power consumption. As the size of the LCD having the edge-type backlight assembly is gradually increased, the brightness of an image displayed by the LCD is decreased. In this aspect, the edge-type backlight assembly is applied to a relatively small size of LCD such as the monitor of a lap-top computer or a small-sized desk top computer.

FIG. 1 is an exploded perspective view illustrating a related LCD having an edge-type backlight assembly, and FIG. 2 is a sectional view taken along line I-I' of the related LCD of FIG. 1. Referring to FIGS. 1 and 2, the related LCD includes a liquid crystal panel 10 displaying an image, a backlight assembly 20 providing flat light to the rear surface of the liquid crystal panel 10, and a top case 11 enclosing an edge of the liquid crystal panel 10 and sides of the backlight assembly 20.

The backlight assembly 20 includes a bottom cover 80 fastened with a support main 40. A lamp 60, a lamp housing 61, a reflector 70, a light guide plate 50, and a set of optical sheets 30 are received into the support main 40, and are supported by the bottom cover 80. The support main 40 supports the liquid crystal panel 10.

The light guide plate 50 allows light emitted from the lamp 60 to travel to the liquid crystal panel 10 in the form of flat light. To this end, the light guide plate 50 is made of material having superior light transmittance. In addition, the light guide plate 50 has a prism pattern capable of increasing an amount of the flat light. Although not illustrated, the prism pattern is formed on the rear surface of the light guide plate 50.

The lamp 60 is disposed near one side of the light guide plate 50 so as to be in one plane by the light guide plate 50. The light emitted from the lamp 60 is incident onto one side (hereinafter, referred to as "incident plane") of the light guide plate 50. The lamp 60 is provided with electrodes 63 at opposite ends thereof. An entire length of the lamp 60 does not exceed the incident plane of the light guide plate 50. This functions to prevent the size of the LCD from exceeding an effective screen of the liquid crystal panel 10.

The lamp housing 61 reflects some of the light, which is emitted from the lamp 60 toward to the other directions than the incident plane of the light guide plate 50, to the incident plane of the light guide plate 50, thereby increasing the efficiency of using the light emitted from the backlight assembly.

In the related LCD having the edge-type backlight assembly, the electrodes 63 of the lamp 60 correspond to opposite ends of the incident plane of the light guide plate 50. An amount of the light that is incident onto the opposite ends of the incident plane of the light guide plate 50 is relatively smaller, compared to the other portion of the incident plane of the light guide plate 50. As such, an amount of the light that exits from corner regions (black regions of FIG. 1) of the light guide plate 50 on the side of the incident plane of the light guide plate 50 is relatively smaller, compared to the other surface regions of the light guide plate 50. In other words, the related edge-type backlight assembly has no alternative but to emit a remarkably small amount of light from some of the surface regions corresponding to the electrodes 63 of the lamp 60. As a result, the image displayed on the liquid crystal panel 10 inevitably has shadows (dark portions). The non-uniform brightness caused by the shadows degrades a quality of the image displayed by the LCD.

In order to inhibit the shadows from being generated, the edge-type backlight assembly is provided with a plurality of diffusion sheets. However, these diffusion sheets have difficulty in making the LCD lightweight, thin, and inexpensive, and furthermore cannot sufficiently inhibit the shadows and the non-uniform brightness caused by the shadows.

In addition, the light incident onto the incident plane of the light guide plate 50 includes the light (hereinafter, referred to as "direct light") that is directly incident from the lamp 60, and the light (hereinafter, referred to as "reflected light") that is reflected by the lamp housing 61. The reflected light is incident onto the incident plane of the light guide plate 50 at a large angle with respect to the surface of the light guide plate 50, compared to the direct light. As such, the light guide plate 50 allows a lot of light to be irradiated in the proximity of the incident plane of the light guide plate 50. More specifically, as illustrated in FIG. 2, the light guide plate 50 has a spectral region (i.e. bright lines (bright band)) Ws where a lot of light is irradiated, and a spectral region (i.e. dark lines (dark band)) Bs where a relatively small of light is irradiated. In other words, the related edge-type backlight assembly has difficulty in irradiating uniform flat light to the liquid crystal panel. The non-uniformity of this flat light leads to the bright lines (bright band) and the dark lines (dark band) within the image displayed on the liquid crystal panel 10. As a result, the LCD using the edge-type backlight assembly not only has difficulty in displaying the image having uniform brightness but also has no choice but to deteriorate the image quality.

SUMMARY OF THE INVENTION

Accordingly, the present invention is directed to a backlight assembly capable of emitting flat light that substantially obviates one or more of the problems due to limitations and disadvantages of the related art, and a liquid crystal display using the same.

An advantage of the present invention is to provide a backlight assembly, which is suitable for emitting uniform flat light.

Another advantage of the present invention is to provide a backlight assembly, which is suitable for displaying an image of uniform brightness.

Another advantage of the present invention is to provide a liquid crystal display, which is suitable for displaying a good quality of image.

According to an aspect of the present invention, there is provided a backlight assembly, which including a lamp, and a light guide plate having a plane facing the lamp that causes light from the lamp to travel in the form of flat light. The light guide plate includes one or more rounded portion at one or more edges of the plane facing the lamp. The one or more rounded portion cause the light from the lamp to travel into the light guide plate. Alternatively, the one or more rounded portions may include a pattern.

According to another aspect of the present invention, there is provided a liquid crystal display, which comprises a backlight assembly including a light guide plate having a plane facing a lamp that causes the light from the lamp to travel in the form of flat light, and a liquid crystal panel controlling an amount of flat light transmitted from the light guide plate to display an image. The light guide plate includes one or more rounded portions at one or more edges of an incident plane thereof onto which the light from the lamp is incident.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention together with the description, and serve to explain the principle of the invention.

DETAILED DESCRIPTION OF THE ILLUSTRATED EMBODIMENTS

Figure 1:
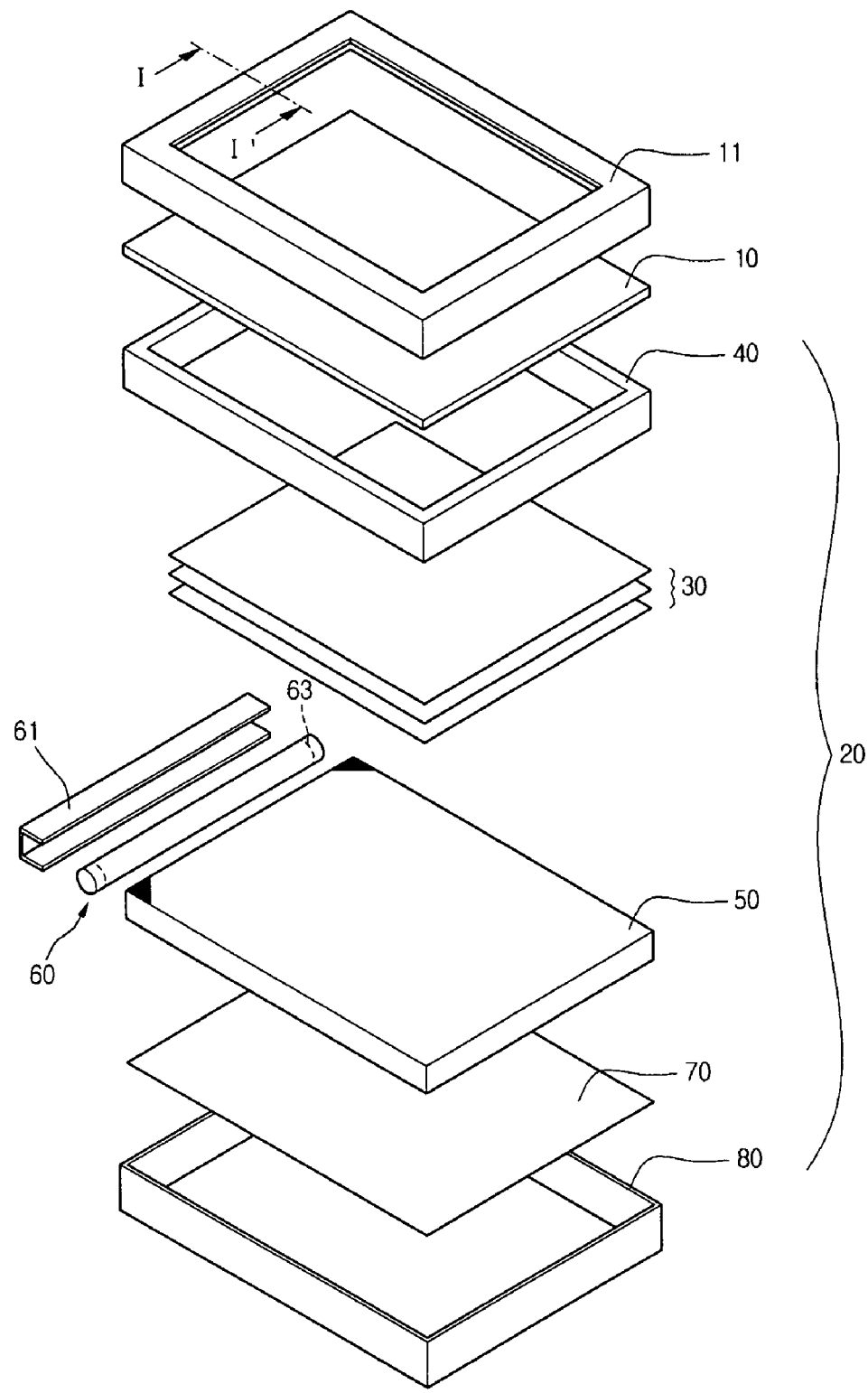
FIG. 1 is an exploded perspective view illustrating a related liquid crystal display (LCD) having an edge-type backlight assembly.
Figure 2:
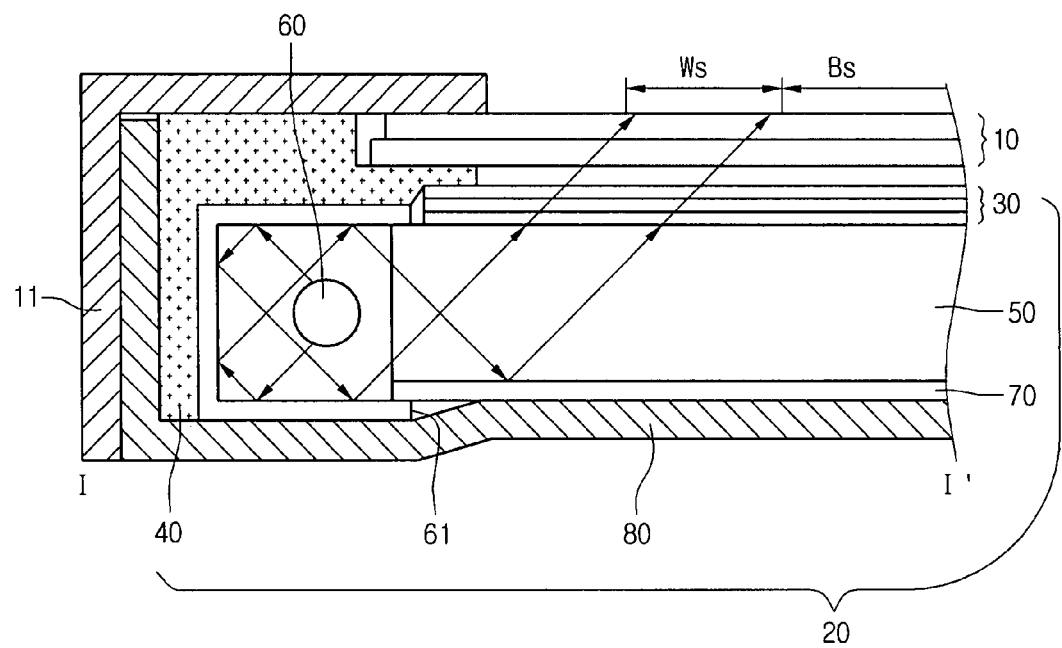
FIG. 2 is a sectional view taken along line I-I' of the related LCD of FIG. 1.

Hereinafter, exemplary embodiments of the present invention will be described with reference to the accompanying drawings. In the drawings, components having the same operations and functions are designated by the same reference numerals.

Figure 3:
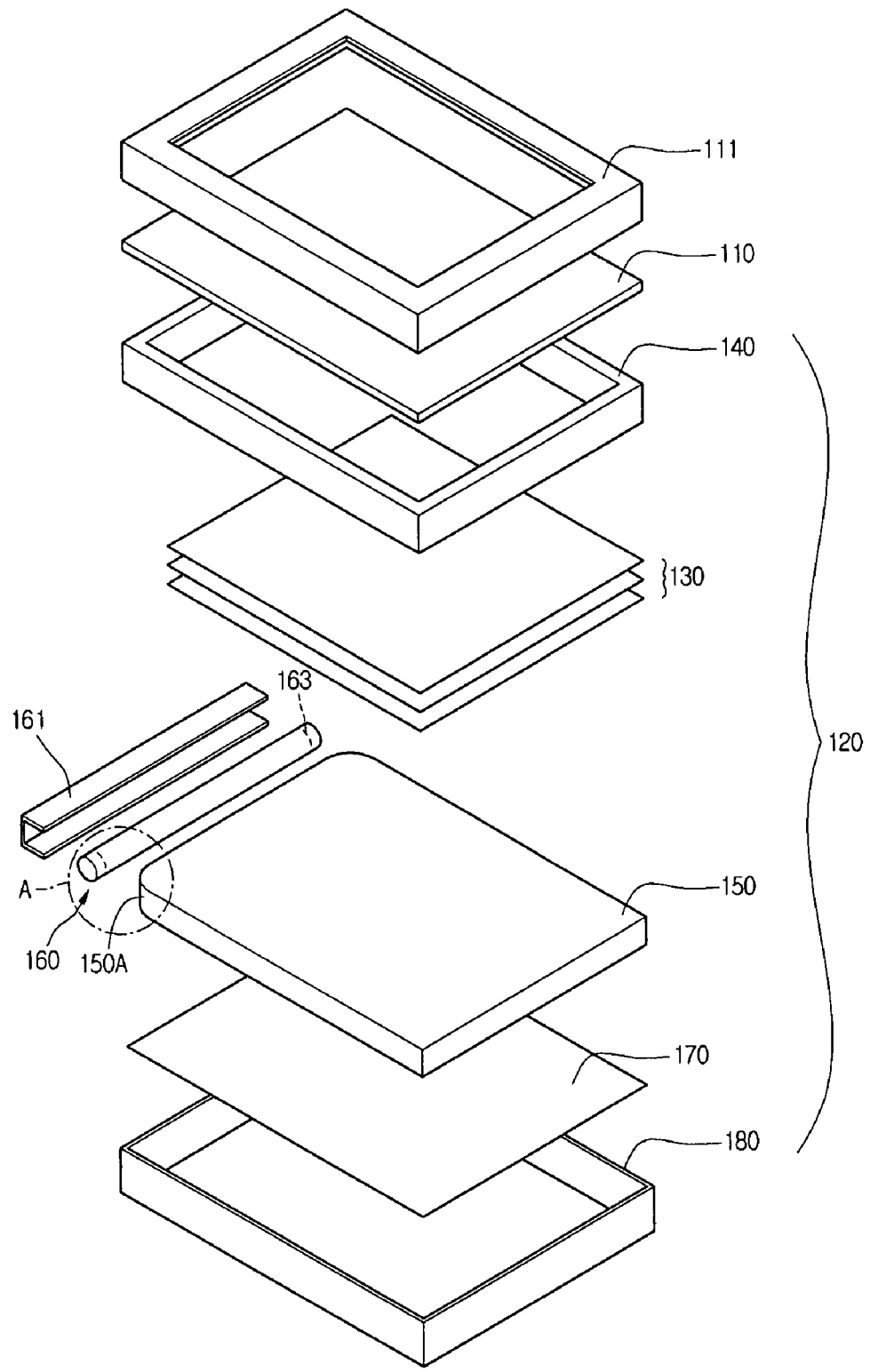
FIG. 3 is an exploded perspective view illustrating an LCD having a backlight assembly according to a first embodiment of the present invention.
Figure 4:
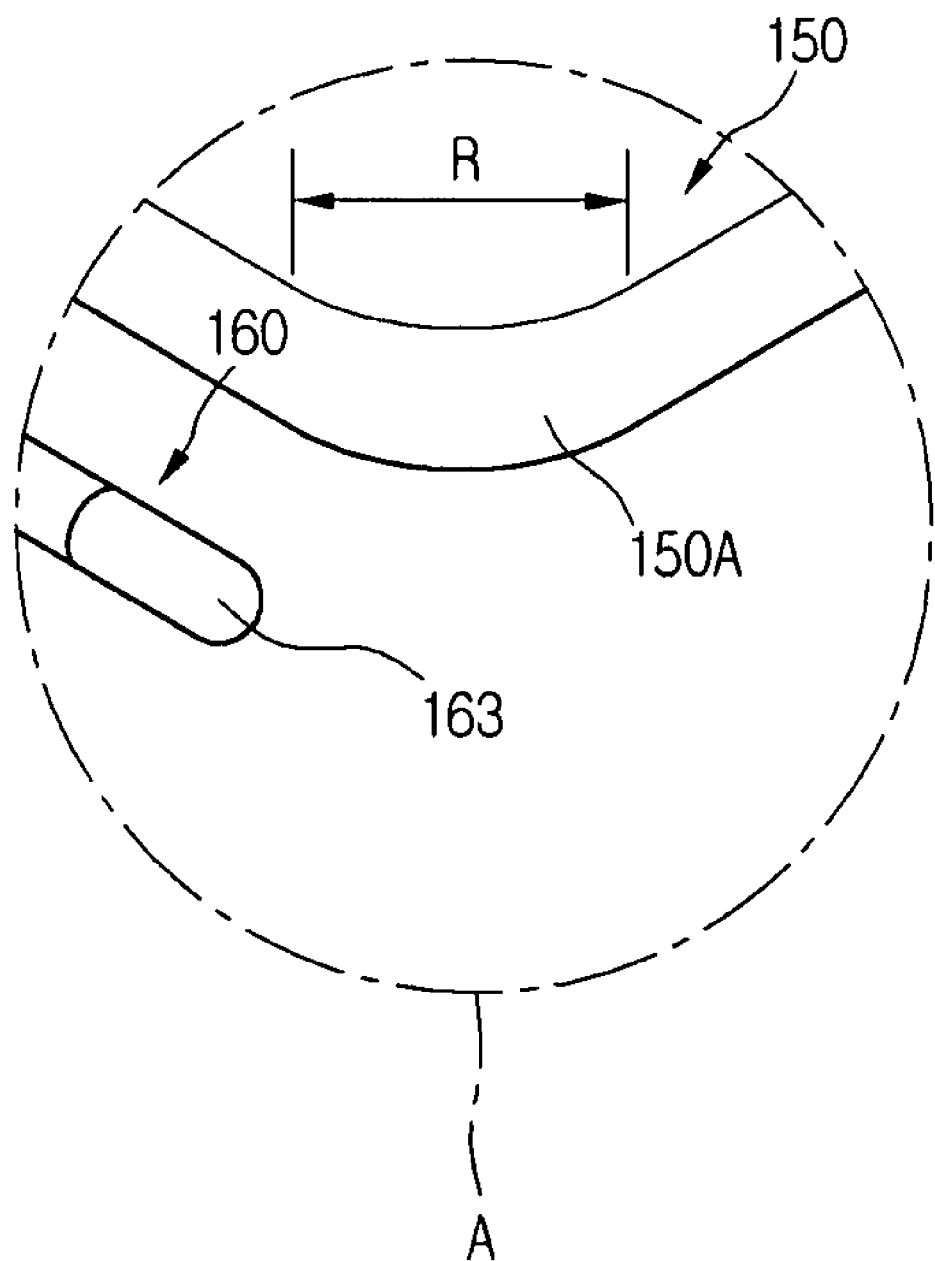
FIG. 4 is a partial detailed view illustrating part A of FIG. 3.

FIG. 3 is an exploded perspective view illustrating a liquid crystal display (LCD) having a backlight assembly according to a first embodiment of the present invention. FIG. 4 is a partial detailed view illustrating parts of the lamp 160 and the light guide plate 150 in part A of FIG. 3. The LCD of FIG. 3 includes a liquid crystal panel 110 displaying an image, a backlight assembly 120 providing flat light to the rear surface of the liquid crystal panel 110, and a top case 111 enclosing an edge of the liquid crystal panel 110 and sides of the backlight assembly.

The liquid crystal panel 110 includes a thin film transistor array substrate and a color filter substrate that are bonded together such that a uniform cell gap is maintained, and a liquid crystal layer interposed between the thin film transistor array substrate and the color filter substrate.

The backlight assembly 120 includes a support main 140, which has the shape of a frame and received in a box-like bottom cover 180. The support main 140 is fixed to the bottom cover 180 by screws or hooks. The liquid crystal panel 110 is located in the support main 140. In other words, the liquid crystal panel 110 is supported by the support main 140.

A reflector 170, a light guide plate 150, and a set of optical sheets 130 are sequentially stacked in a space defined by the bottom cover 180 and the support main 140. The backlight assembly 120 further includes a lamp 160 disposed on one side (hereinafter, referred to as "incident plane") of the light guide plate 150 so as to form one plane of the light guide plate 150, and a lamp housing 161 enclosing the lamp 160 together with the incident plane of the light guide plate 150.

The lamp 160 is driven by drive voltage from the outside, thereby emitting light. The lamp 160 is formed to be long along a lengthwise direction of the light guide plate 150. The lamp 160 is provided with electrodes 163 on opposite ends thereof. An entire length of the lamp 160 including the electrodes 163 is limited so as not to exceed a length of the incident plane of the light guide plate 150. This functions to prevent a geometry of the LCD from being too increased, compared to an effective screen of the liquid crystal panel 110.

The lamp housing 161 reflects some of the light, which is emitted from the lamp 160 and then travels to the other directions than the incident plane of the light guide plate 150. The reflection of the lamp housing 161 causes the lamp 160 and the backlight assembly 120 to increase the efficiency of using the light.

The optical sheet set 130 diffuses and collects the flat light traveling from the surface of the light guide plate 150 to the rear surface of the liquid crystal panel 110. The optical sheet set includes a diffusion sheet that diffuses the light radiating from the light guide plate 150 to the rear surface of the liquid crystal panel 110, a prism sheet that collects the light diffused by the diffusion sheet, and a protection sheet that protects the prism sheet. The optical sheet set 130 makes more uniform the flat light to be irradiated to the liquid crystal panel 110.

The reflector 170 reflects the light, which travels from the rear surface of the light guide plate 150 to the bottom cover 180, onto the rear surface of the light guide plate 150 again. The reflection of the reflector 170 causes the backlight assembly 120 to further increase the efficiency of using the light. In other words, the reflector 170 prevents the light from leaking out toward the rear surface of the light guide plate 150, thereby minimizing the loss of light.

The light guide plate 150 causes direct light that is directly incident from the lamp 160 and reflected light that is reflected by the lamp housing to travel to the rear surface of the liquid crystal panel 120 in the form of flat light. For the purpose of changing the path and shape of light, the light guide plate 150 may have a thickness gradually reduced in proportion to a distance from the incident plane thereof. In addition, the light guide plate 150 may have a prism pattern (not shown) in order to improve a characteristic of changing the light path (i.e. a characteristic of refracting the light). This prism pattern may be formed on the rear surface of the light guide plate 150. The light guide plate 150 may be made of a material capable of transmitting the light. This transmittable material may be an acrylic transparent resin such as polymethyl methacrylate (PMMA), which has a refractive index of about 1.49, and a specific gravity of about 1.19. Further, for the purpose of a light weight, an olefinic transparent resin having a specific gravity of about 1.0 may be used. Further, the light guide plate 150 may have a thickness between about 2 mm and about 3 mm, with the size depending on a size of the LCD.

Furthermore, the light guide plate 150 may have rounded portions 150A at opposite ends of the incident plane thereof which correspond to the electrodes 163 of the lamp 160. In other words, as in FIG. 4, opposite corners of the light guide plate 150 located on the side of the incident plane of the light guide plate 150 may be rounded, thereby having the rounded portions 150A. The rounded portions 150A do not require a separate process, because they may be formed by an injection molding process of the light guide plate 150. Further, a distance between the rounded portions 150A may be longer than that between the electrodes 163 of the lamp 160. Also, the round portions 150A are formed of the structure having a convex surface. In this way, the rounded portions 150A provided at the regions corresponding to the electrodes 163 scatter the light that is incident from the lamp 160 and the lamp housing 161 onto the opposite ends of the incident plane of the light guide plate 150 (i.e. the opposite corners of the light guide plate 150 located on the side of the incident plane of the light guide plate 150). This scattered light sufficiently radiates toward the corners of the liquid crystal panel 110, which correspond to the rounded portions 150A of the light guide plate 150 at the rear of the liquid crystal panel 110. This configuration can further increase an amount of the light traveling from the corners of the light guide plate 150, which are adjacent to the electrodes 163 of the lamp 160, to the corners of the liquid crystal panel, which correspond to the rounded portions of the light guide plate 150 at the rear of the liquid crystal panel. As a result, in the case of the image displayed on the liquid crystal panel 110, the brightness at the corners thereof is similar to that at the other region thereof. Furthermore, the LCD can not only provide an image having uniform brightness, but also improve a quality of the image.

Figure 5:
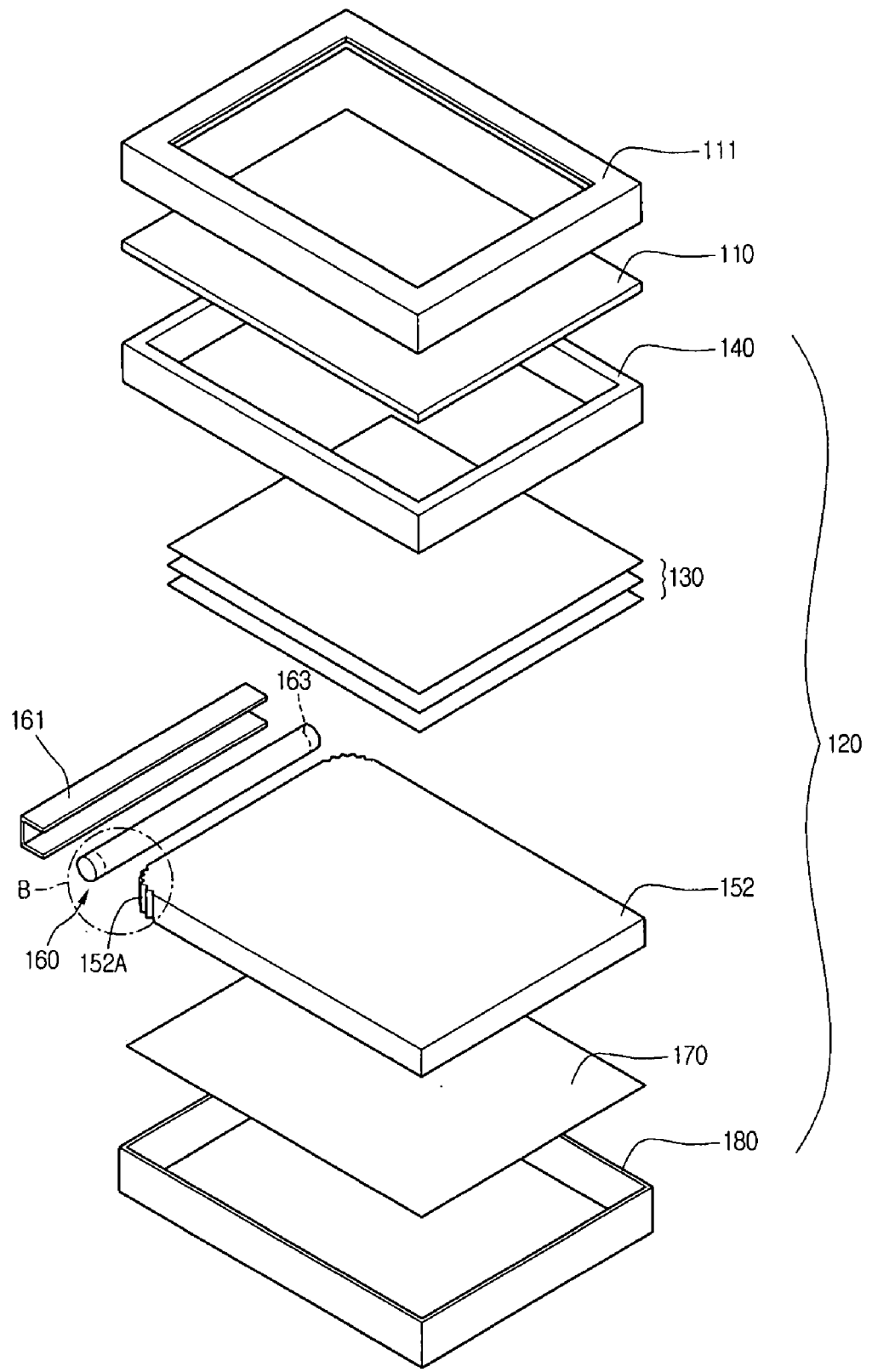
FIG. 5 is an exploded perspective view illustrating an LCD having a backlight assembly according to a second embodiment of the present invention.
Figure 6:
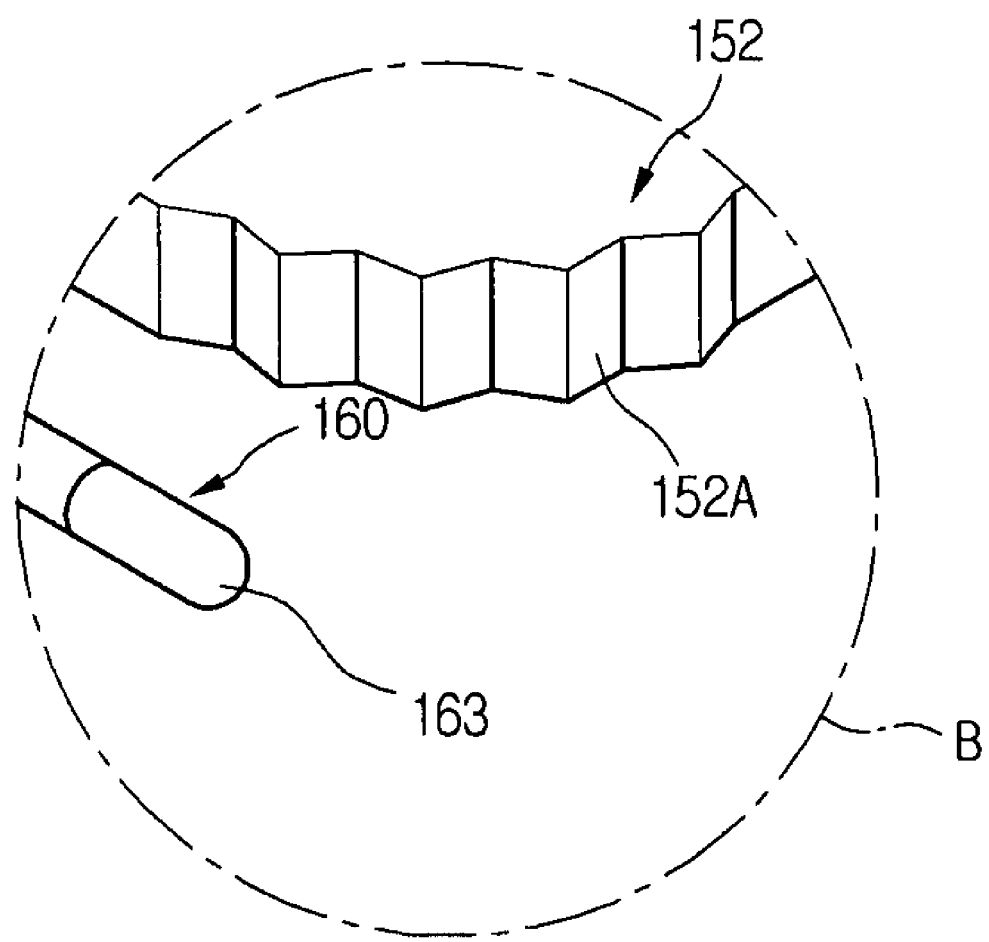
FIG. 6 is a partial detailed view illustrating parts of the lamp and the light guide plate in part B of FIG. 5.

FIG. 5 is an exploded perspective view illustrating an LCD having a backlight assembly according to a second embodiment of the present invention. FIG. 6 is a partial detailed view illustrating parts of the lamp and the light guide plate in part B of FIG. 5. The LCD of FIG. 5 has the same configuration as that of FIG. 3, except that the light guide plate 150 is replaced by a light guide plate 152. The components of FIG. 5 having the same structures, functions and operations as those of FIG. 3 will be designated by the same reference numerals. The structures, functions and operations associated with the components of FIG. 5 are obviously disclosed through the description of FIG. 3, and so the description thereof will be omitted.

The light guide plate 152 may include patterned rounded portions 152A. The patterned rounded portion 152A, which may be formed at opposite ends of the incident plane of the light guide plate 152 which correspond to the electrodes 163 of the lamp 160 (i.e. the opposite corners of the light guide plate 152 located on the side of the incident plane of the light guide plate 152), may have a predetermined curvature. Each patterned rounded portions 152A may be provided with a prism pattern. As in FIG. 6, the prism pattern may be formed perpendicular to the rear surface of the light guide plate 152, thereby collecting the light. Instead of this prism pattern, the patterned rounded portions 152A of the light guide plate 152 may have a dotted pattern or a pyramid pattern. Further, the patterned rounded portions 152A do not require a separate process, because they may be formed by an injection molding process of the light guide plate 152. In this manner, the patterned rounded portions 152A provided at the regions corresponding to the electrodes 163 scatter and collect the light that is incident from the lamp 160 and the lamp housing 161 onto the opposite ends of the incident plane of the light guide plate 152 (i.e. the opposite corners of the light guide plate 152 located on the side of the incident plane of the light guide plate 152). This scattered and collected light sufficiently radiates toward the corners of the liquid crystal panel 110, which correspond to the rounded portions 152A of the light guide plate 152 at the rear of the liquid crystal panel 110. This configuration can further increase an amount of the light traveling from the corners of the light guide plate 152, which are adjacent to the electrodes 163 of the lamp 160, to the corners of the liquid crystal panel 110, which correspond to the rounded portions of the light guide plate 152 at the rear of the liquid crystal panel 110. As a result, in the case of the image displayed on the liquid crystal panel 110, the brightness at the corners thereof is similar to that at the other region thereof. Furthermore, the LCD can not only provide an image having uniform brightness, but also improve a quality of the image.

Figure 7:
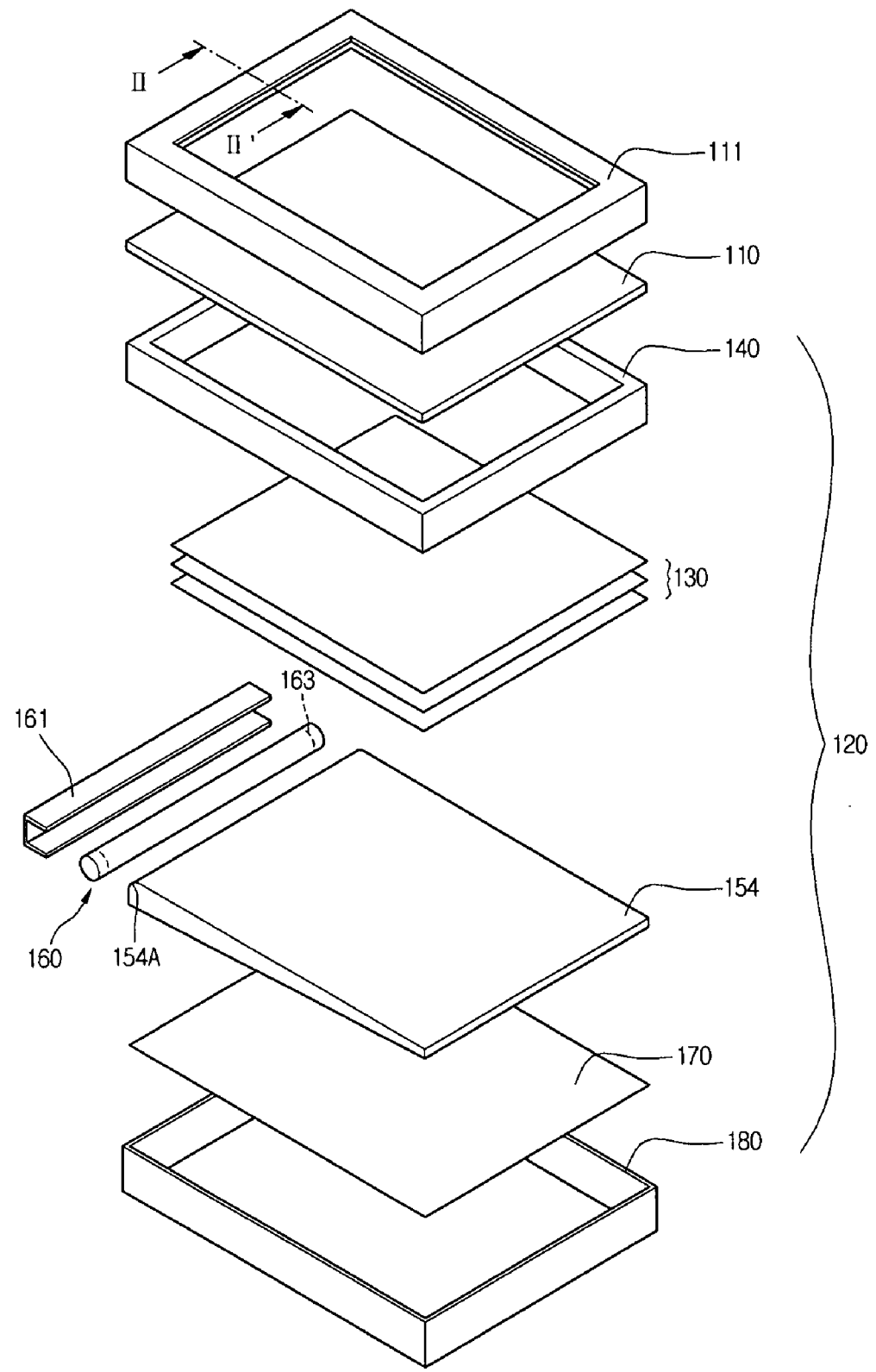
FIG. 7 is an exploded perspective view illustrating an LCD having a backlight assembly according to a third embodiment of the present invention.
Figure 8:
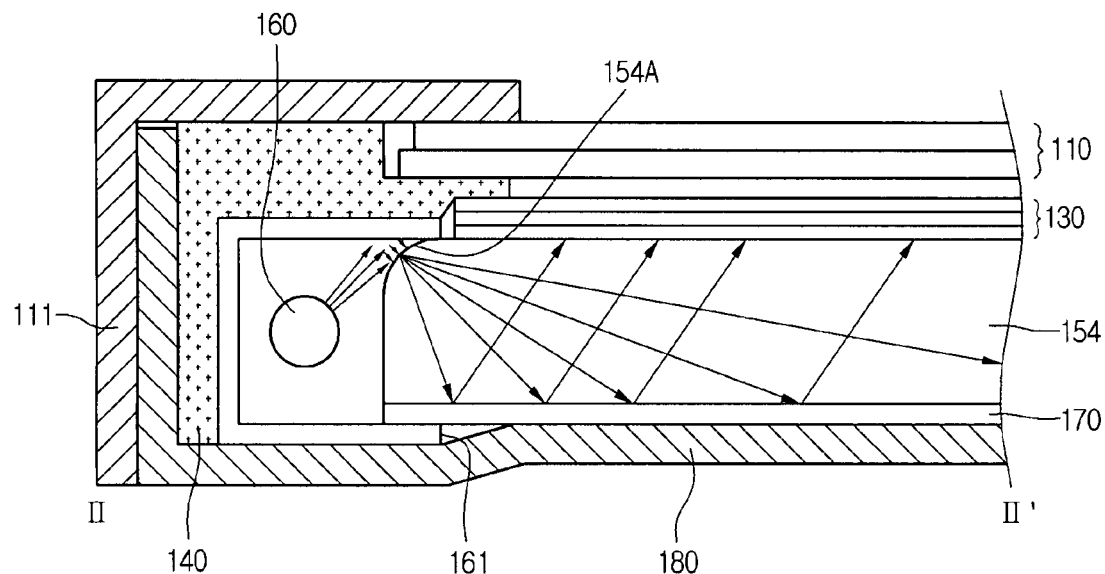
FIG. 8 is a sectional view taken along line II-II' of the LCD of FIG. 7.

FIG. 7 is an exploded perspective view illustrating an LCD having a backlight assembly according to a third embodiment of the present invention. FIG. 8 is a sectional view taken along line II-II' of the LCD of FIG. 7. The LCD of FIGS. 7 and 8 has the same configuration as that of FIG. 3, except that the light guide plate 150 is replaced by a light guide plate 154. The components of FIGS. 7 and 8 having the same structures, functions and operations as those of FIG. 3 will be designated by the same reference numerals. The structures, functions and operations associated with the components of FIGS. 7 and 8 are obviously disclosed through the description of FIG. 3, and so the description thereof will be omitted.

The upper side (i.e. upper edge) of the incident plane of the light guide plate 154 may be rounded. In other words, the light guide plate 154 may be provided with a rounded portion 154A at the upper edge of the incident plane thereof. The rounded portion 154A may be formed along the upper side (i.e. upper edge) of the incident plane of the light guide plate 154. The rounded portion 154A does not require a separate process, because it may be formed by an injection molding process of the light guide plate 154. Also, the round portion 150A is formed of the structure having a convex surface.

This rounded portion 154A scatters the direct light from the lamp 160 and the indirect light from the lamp housing 161, and diffuses the light traveling into the light guide plate 154. The light traveling into the light guide plate 154 is uniformly distributed within an angle of about 90° with respect to a rear surface (or a front surface) of the light guide plate 154. The flat light reflected from the surface of the light guide plate 154 is made uniform without leaning to one side in a band shape. Thus, the backlight assembly can emit the uniform flat light to the liquid crystal panel 110. The uniform flat light from the backlight assembly prevents bright lines (bright band) and dark lines (dark band) from being detected from the image displayed on the liquid crystal panel 110. Thus, the LCD can improve a quality of the image. Alternatively, the rounded portion 154A of the light guide plate 154 may have any one of a prism pattern, a dotted pattern, and a pyramid pattern. In this case, the prism pattern, the dotted pattern, or the pyramid pattern may be formed on the round 154A.

Figure 9:
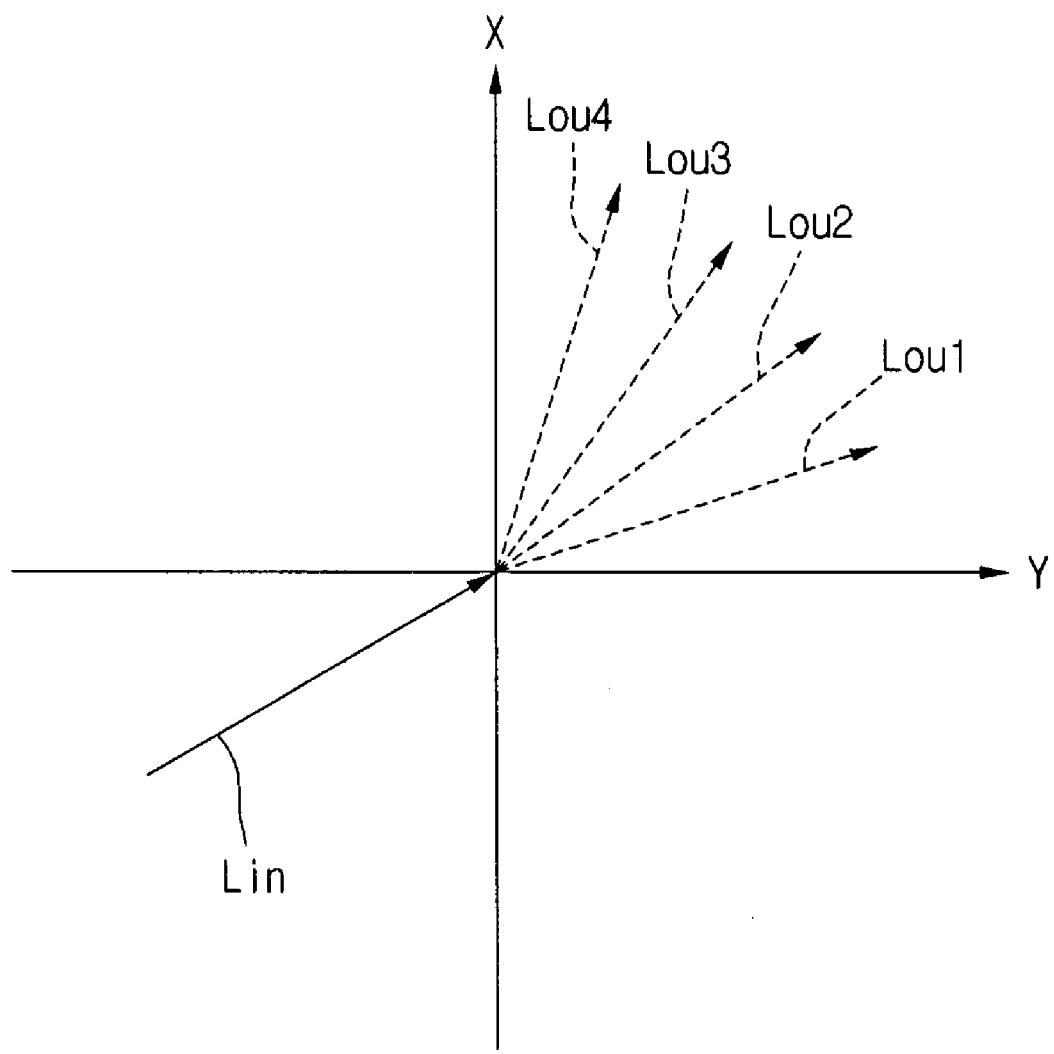
FIG. 9 is a characteristic graph for explaining the relation between incident light and transmitted light at the round of FIGS. 7 and 8.

FIG. 9 is a characteristic graph for explaining the relation between incident light Lin and transmitted light Lou at the rounded portion 154A of FIGS. 7 and 8. In FIG. 9, the Y-axis represents a surface of the light guide plate 154, and the X-axis represents a direction perpendicular to surface of the light guide plate 154. The incident light Lin that is incident onto the rounded portion 154A of the light guide plate 154 is refracted at any one of the angles between 0° and 90° with respect to the surface of the light guide plate 154 according to a curvature of the rounded portion 154A. This is because the angle between the rounded portion 154A and the incident light Lin is varied according to a position of the incident light Lin that is incident onto the roundeded portion 154A. Thus, the light that is incident onto the rounded portion 154A travels in the light guide plate 154 in the state in which it is uniformly diffused within an angle of 90°.

Figure 10:
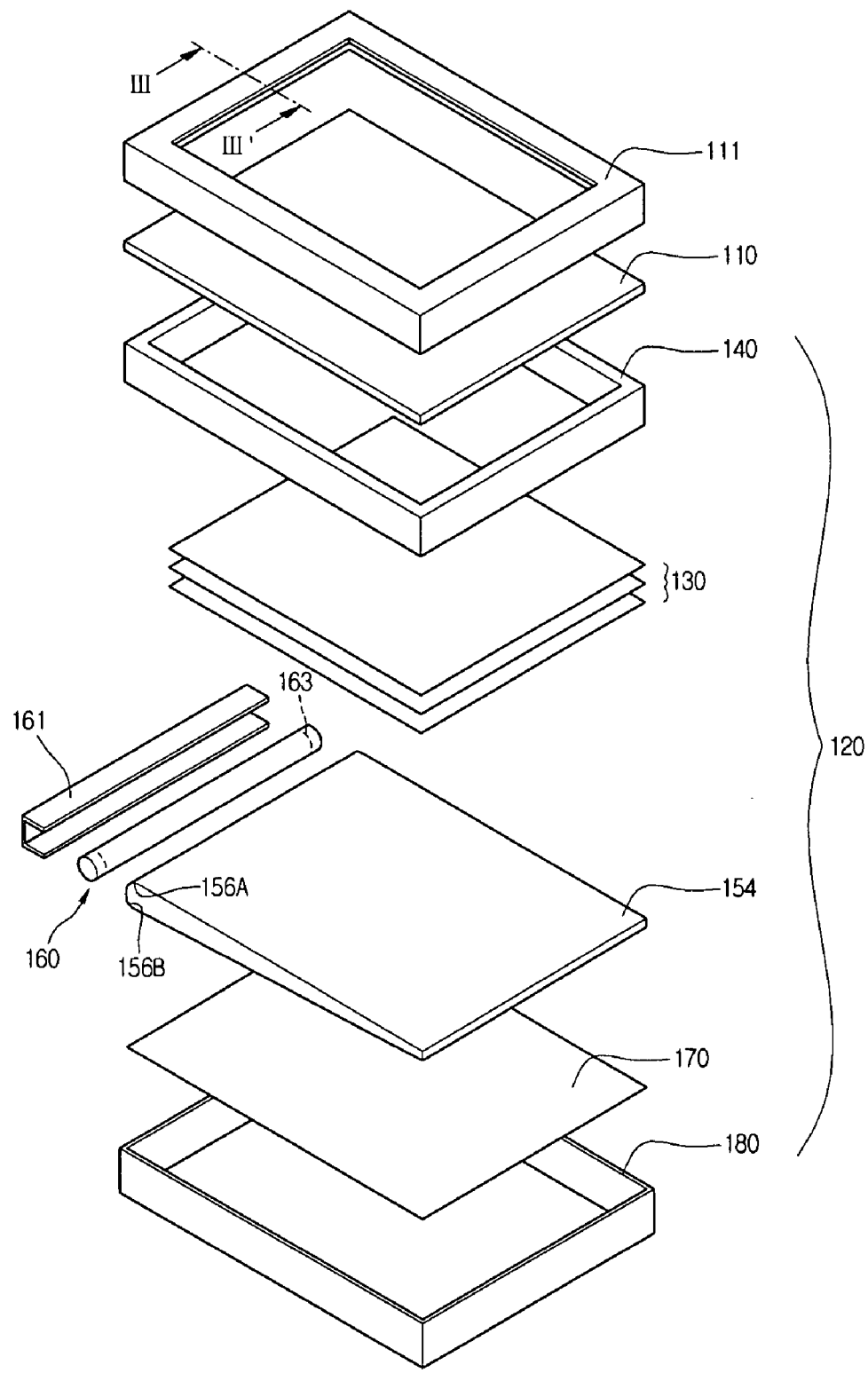
FIG. 10 is an exploded perspective view illustrating an LCD having a backlight assembly according to a fourth embodiment of the present invention.
Figure 11:
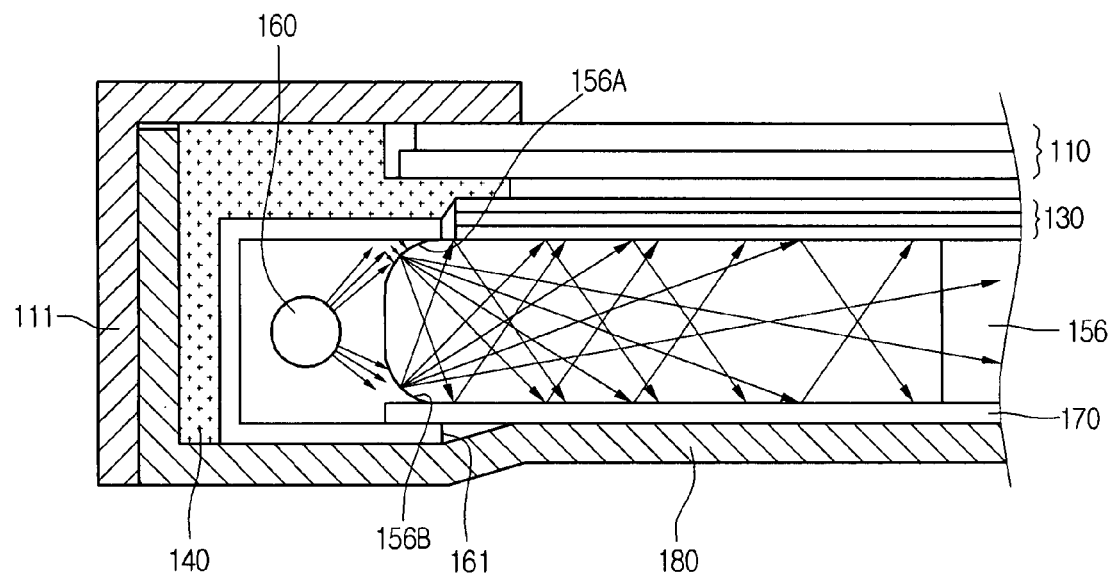
FIG. 11 is a sectional view taken along line III-III' of the LCD of FIG. 10.

FIG. 10 is an exploded perspective view illustrating an LCD having a backlight assembly according to a fourth embodiment of the present invention. FIG. 11 is a sectional view taken along line III-III' of the LCD of FIG. 10. The LCD of FIGS. 10 and 11 has the same configuration as that of FIG. 3, except that the light guide plate 150 is replaced by a light guide plate 156. The components of FIGS. 10 and 11 having the same structures, functions and operations as those of FIG. 3 will be designated by the same reference numerals. The structures, functions and operations associated with the components of FIGS. 10 and 11 are obviously disclosed through the description of FIG. 3, and so the description thereof will be omitted.

The upper and lower sides (i.e. upper and lower edges) of the incident plane of the light guide plate 156 may be rounded. In other words, the light guide plate 156 may be provided with the first rounded portion 156A at the upper edge of the incident plane thereof, and the second rounded portion 156B at the lower edge of the incident plane thereof. The first rounded portion 156A may formed along the upper side (i.e. upper edge) of the incident plane of the light guide plate 156, whereas the second round 156B is formed along the lower side (i.e. lower edge) of the incident plane of the light guide plate 156. The first and second rounded portions 156A and 156B do not require a separate process, because they may be formed by an injection molding process of the light guide plate 156. Also, The first and second rounded portions 156A and 156B are formed of the structure having a convex surface.

The first and second rounded portions 156A and 156B scatter the direct light from the lamp 160 and the indirect light from the lamp housing 161, and diffuse the light traveling into the light guide plate 156. The light traveling into the light guide plate 156 is uniformly distributed within an angle of about 90° with respect to a rear surface (or a front surface) of the light guide plate 156. The flat light reflected from the surface of the light guide plate 156 is made uniform without leaning to one side in a band shape. Thus, the backlight assembly can emit the uniform flat light to the liquid crystal panel 110. The uniform flat light from the backlight assembly prevents bright lines (bright band) and dark lines (dark band) from being detected from the image displayed on the liquid crystal panel 110. Thus, the LCD can improve a quality of the image.

Alternatively, the first and second rounded portions 156A and 156B of the light guide plate 156 may have any one of a prism pattern, a dotted pattern, and a pyramid pattern. In this case, the prism pattern, the dotted pattern, or the pyramid pattern may be formed on the first and second rounded portions 156A and 156B.

As described above, according to the present invention, the backlight assembly forms the rounded portion at one or more edges of the incident plane of the light guide plate, thereby scattering the incident light. Thus, the brightness of the light radiating from the corner regions of the light guide plate which correspond to the electrodes of the lamp can be similar to that of the light radiating from the other region. Further, the angles of the light traveling into the light guide plate are uniformly distributed within an angle of 90° with respect to the front surface (or rear surface) of the light guide plate. Thus, the backlight assembly can emit the light uniformly distributed in the form of flat light without a lopsided portion. The uniform flat light from the backlight assembly prevents the shadows (dark portions), bright lines (bright band) and dark lines (dark band) from being detected from the image displayed on the liquid crystal panel. Thus, the LCD can improve a quality of the image.

Although the invention has been described with reference to specific embodiments, it will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight assembly comprising:
   a lamp; and
   a light guide plate having an incident plane facing the lamp that causes light from the lamp to travel in a form of flat light,
   wherein the light guide plate includes one or more rounded portions at one or more side corners of the plane facing the lamp and a plane portion at region other than the side corners in the plane facing the lamp, the one or more rounded portions being formed to have prism patterns, wherein the rounded portion is formed of the structure of a convex surface, wherein the rounded portion has the prism patterns formed on the convex surface that the prism patterns are formed perpendicular to a rear surface of the light guide plate, wherein the rounded portion is formed along the edge of the incident plane of the light guide plate to the edge of the adjacent side of the incident plane, and wherein the incident plane between the rounded portions is flat.

2. The backlight assembly as claimed in claim 1, wherein the light guide plate includes the rounded portion at an upper side corner of the plane facing the lamp.

3. The backlight assembly as claimed in claim 1, wherein the light guide plate includes the rounded portions at upper and lower side corners of the plane facing the lamp.

4. The backlight assembly as claimed in claim 1, further comprising a lamp housing enclosing the lamp together with the lamp-facing plane of the light guide plate to reflect the light from the lamp.

5. A liquid crystal display comprising:

a backlight assembly including a light guide plate having an incident plane facing a lamp that causes light from the lamp to travel in a form of flat light; and a liquid crystal panel controlling an amount of flat light transmitted from the light guide plate to display an image, wherein the light guide plate includes one or more rounded portions at one or more side corners of the plane facing the lamp and a plane portion at region other than the side corners in the plane facing the lamp, the one or more rounded portions causing the light from the lamp to travel into the light guide plate, wherein the light guide plate includes the rounded portions at upper and lower side corners of the plane facing the lamp, wherein the rounded portion is formed of the structure of a convex surface, wherein the rounded portion has prism patterns formed on the convex surface that the prism patterns are formed perpendicular to a rear surface of the light guide plate, wherein the rounded portion is formed along the edge of the incident plane of the light guide plate to the edge of the adjacent side of the incident plane, and wherein the incident plane between the rounded portions is flat.

6. The liquid crystal display as claimed in claim 5, further comprising a lamp housing enclosing the lamp together with the lamp-facing plane of the light guide plate to reflect the light from the lamp.

* * * * *